United States Patent
Maemura et al.

(10) Patent No.: US 6,281,980 B1
(45) Date of Patent: *Aug. 28, 2001

(54) MULTIFUNCTIONAL IMAGE PROCESSING FOR PREVENTING PRINTER INTERRUPTION

(75) Inventors: Kohichirou Maemura, Isehara; Nahoko Aizawa, Kawasaki, both of (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,538

(22) Filed: Feb. 23, 1998

(30) Foreign Application Priority Data

Mar. 7, 1997 (JP) .................................................. 9-052915

(51) Int. Cl.$^7$ ...................................................... G06F 15/00
(52) U.S. Cl. ........................ 358/1.14; 358/1.15; 358/1.13
(58) Field of Search .................................... 395/112, 113, 395/106, 114; 358/442, 1.13, 1.14, 1.6, 1.15, 437, 1.16, 1.17, 1.18, 1.1, 407, 468, 434, 435, 436, 438, 439; 399/81, 82, 87

(56) References Cited

U.S. PATENT DOCUMENTS

| | | | |
|---|---|---|---|
| 4,090,787 | * 5/1978 | Hubbard et al. | 399/20 |
| 5,152,001 | * 9/1992 | Hanamoto | 713/1 |
| 5,293,253 | 3/1994 | Kida et al. | 347/43 |
| 5,394,462 | 2/1995 | Maemura | 347/54 |
| 5,511,150 | * 4/1996 | Beaudet et al. | 395/113 |
| 5,559,933 | * 9/1996 | Boswell | 395/114 |
| 5,585,941 | 12/1996 | Maemura | 347/14 |
| 5,633,731 | 5/1997 | Maemura | 347/20 |
| 5,758,070 | * 5/1998 | Lawrence | 709/220 |
| 5,828,863 | * 10/1998 | Barrett et al. | 395/500 |

* cited by examiner

*Primary Examiner*—Dov Popovici
(74) *Attorney, Agent, or Firm*—Cooper & Dunham LLP

(57) ABSTRACT

A digital multifunctional image processing system has a plurality of functions including copying, sending facsimile data, and printing out data sent either from a personal computer or a facsimile machine. The digital multifunctional image processing system includes a printer, a scanner unit, and at least one external input. An operation panel is provided for inputting copying parameters. Parameter input detecting means detects input of the at least one copying parameter. The digital multifunctional image processing system further includes interruption detecting unit for detecting an external interruption printing request and an inhibiting unit that inhibits printing of the printing data associated with the request while the at least one copying parameter is being input.

26 Claims, 6 Drawing Sheets

MULTIFUNCTIONAL IMAGE PROCESSING FOR PREVENTING PRINTER INTERRUPTION

BACKGROUND

1. Field of the Invention

The present application relates to a digital multifunctional image processing system and apparatus capable of selectively copying from a document, sending and receiving a facsimile and printing out data sent from a facsimile. More particularly, the present application relates to a system and apparatus capable of inhibiting printing of a printing request from a facsimile and a personal computer during inputting of a copying parameter for copying.

2. Description of the Related Art

A background digital multifunctional image processing system generally includes a printer for printing on a sheet, a scanner unit for reading a document, a MODEM for facsimile transmission, and a personal computer and a facsimile connected to the system via a line and a telephone line, respectively. The system has a copying function for copying from a document, and a printing function for printing data sent from either the personal computer (hereinbelow referred to as a PC) or the facsimile.

In such a background digital multifunctional image processing system, each of these functions can generally be controlled to separately work by avoiding overlapping of the functions or controls for the functions. Therefore, a printing request can be accepted from a PC used in an office relatively close to the multifunctional image processing system or from a facsimile disposed remote therefrom, if the printer is not currently being used by the system.

This means, however, that if an operator is using the copying function and is inputting one or more copying parameters (e.g., a number of copies, density of a toner image, a paper size and so on) to the system, since the operator has not yet pressed a button for starting the copying operation, a controller, not shown, may judge that the printer is not in use and may accept a printing request from another facsimile or PC. Accordingly, the operator who set the parameters in order to use the copying function may be interrupted by the printing request from the facsimile or PC.

Such interruption unavoidably occurs and is particularly inconvenient for the operator working at an office relatively close to the printer and uses the copying function often.

SUMMARY

The present application relates to a digital multifunctional image processing system having a plurality of functions including copying, sending and receiving a facsimile, printing out a data sent either from a personal computer or a facsimile. The system includes a printer, a scanner unit, and at least one external input. An operation panel has a plurality of keys for inputting at least one copying parameter and parameter input detecting means for detecting input of the at least one copying parameter. The system further includes interruption detecting means for detecting an external interruption printing request from either the personal computer or the facsimile, and an interruption controller for inhibiting printing of the printing request from either a personal computer or a facsimile while the copying parameter for copying is input by an operator to the system.

In another embodiment, the digital multifunctional image processing apparatus further comprises a priority setting means for setting priority to a printing request from the personal computer when an interruption printing request is made by the personal computer during inputting of the copying parameter, a parameter memory for storing copying parameter having been already input before the interruption printing request is made and a parameter controller for controlling the operation panel to reading out the copying parameter stored in the parameter memory and automatically set thereto after the interruption printing having priority of the interruption printing request is completed.

In yet another embodiment, the multifunctional printing system further comprises a facsimile connected thereto by a telephone line, a controller for controlling the printer to inhibit printing of the printing requested from the facsimile while a copying parameter is input to the operation panel and a facsimile transmission data memory for storing a data sent from the facsimile when the printing of the printing request therefrom is inhibited.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Hereinbelow, an embodiment of the present application is explained by referring to the several accompanying drawings.

Figure 4:
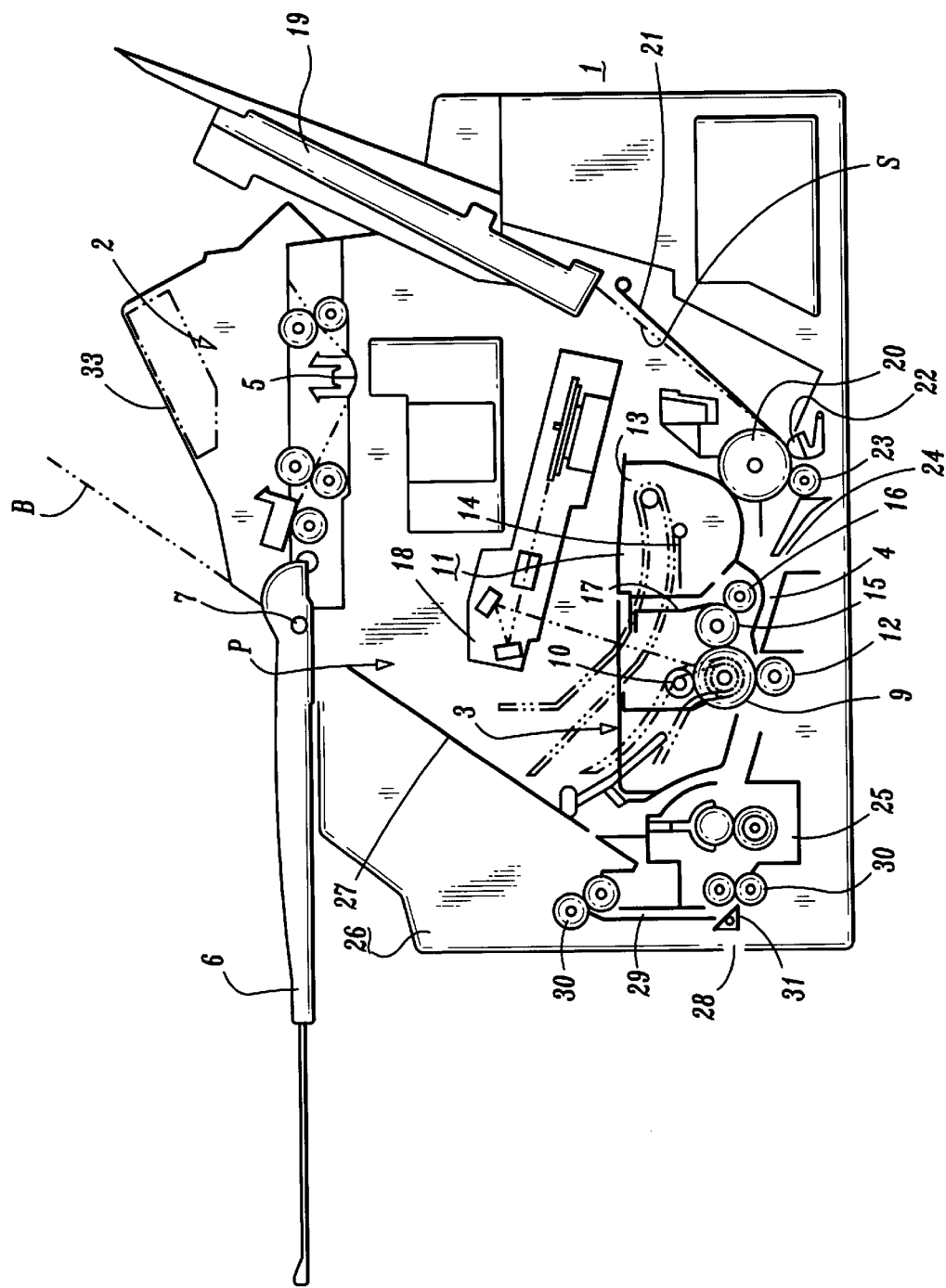
FIG. 4 is a schematic cross sectional view of a digital multifunctional image processing system of the present application shown in FIG. 3.

A digital multifunctional image processing apparatus is explained below by reference to FIG. 4. As shown in FIG. 4, the digital multifunctional image processing apparatus 1 includes a scanner unit 2 disposed at an upper portion thereof for optically reading an image from a document and a printer P having a sheet feeding path 4 and disposed at a lower portion thereof for printing an image on a sheet S fed through the sheet feeding path 4. The scanner unit 2 includes a reading part 5 for optically reading the document and a document setting table 6 for setting the document thereon. The document setting table 6 is pivotally supported by a supporting axis 7 and is capable of swinging from a horizontal position to an inclined position as illustrated by a dotted line B shown FIG. 4. The scanner unit 2 includes an operating panel 33 disposed on an outer surface.

The operating panel 33 is capable of inputting a copying parameter (e.g., a desired number of copysheets, a copysheet size and a magnification of a copy) in a copy mode in which copies are made from a scanned document, for example. In a facsimile mode, the operating panel 33 can be used to input a telephone number so that a facsimile can be sent from the digital multifunctional apparatus 1. The document setting table 6 is also supported by a stopper, not shown, at the horizontal position as shown in FIG. 4.

The printer P includes a process cartridge 3 detachably installed therein. The process cartridge 3 includes an image carrier 9 therein freely rotating around an axis thereof, a charger 10 contacting the surface of the image carrier 9 for charging the surface thereof, a developing device 11 for developing a latent image formed on the surface of the image carrier 9 and a transfer device 12 contacting the surface of the image carrier 9 for transferring a toner image from image carrier 9 onto a sheet which is fed along sheet feeding path 4. The developing device 11 includes a toner container 13 united to the process cartridge 3 for containing toner therein, a paddle member 14 freely rotating around an axis thereof disposed in the toner container 13 for paddling the toner, a developing roller 15 contacting the image carrier 9 for applying the toner thereto, a toner applying roller 16 contacting the developing roller 15 for applying the toner thereon and a blade member 17 pressure contacting the developing roller 15 for scraping the toner carried thereon.

The printer P further includes a latent image forming unit 18 disposed above the process cartridge 3 for irradiating a laser beam modulated by an image signal onto a surface of the image carrier 9 thereby forming a latent image thereon. The printer P further includes a multiple utility tray 19 disposed at one side of the printer P and upwardly inclined for both receiving a document having been read by the scanner unit 2 and supporting a sheet S to be fed toward the process cartridge 3 in an inclined state. The printer P further includes a feeding roller 20 disposed below the multiple utility tray 19 and driven by a motor, not shown, a pressure plate 21 for pressing the sheet S supported on the multiple utility tray 19 against the feeding roller 20, a separating pad 22 and a separating roller 23 in pressure contact with the feeding roller 20 for separating a sheet from a stack thereof supported on the multiple utility tray 19 to avoid feeding a plurality of sheets S.

Such a feeding roller 20, separating pad 22 and separating roller 23 are located at an inlet of the sheet feeding path 4 as shown FIG. 4. The sheet feeding path 4 may also include a bottom path 24 for leading a sheet S from a tray (not shown) provided at the bottom of the printer P. The printer P further includes a fixing device 25 disposed downstream of the sheet feeding path 4 for fixing toner transferred onto the sheet S.

The printer P further includes a sheet receiving device 26 disposed between the document setting table 6 and the fixing device 25. The sheet receiving device 26 has an inclined surface 27 disposed on an extension line of the document setting table 6 when the document setting table 6 is swung and positioned on the dotted line B, thereby cooperatively enabling the printer to receive a long sized sheet thereon.

The printer P further includes an outlet 28 disposed below the sheet receiving device 26 and adjacent the fixing device 25 for leading the sheet S fed from the fixing device 25 to an outside of the printer P in a horizontal direction. An inverting and ejecting path 29 is disposed downstream of the fixing device 25 for selectively inverting the sheet S fed from the fixing device 25 while ejecting the sheet S onto the sheet receiving device 26.

The printer P further includes two pairs of ejecting rollers 30 respectively disposed at an inlet portion of the inverting and ejecting path 29 and an outlet portion thereof for ejecting the sheet S onto the inclined surface 27. A switching gate 31 is capable of freely swinging around an axis thereof for selectively switching a sheet feeding direction for guiding the sheet either toward the outlet 28 or the inverting and ejecting path 29.

Figure 3:
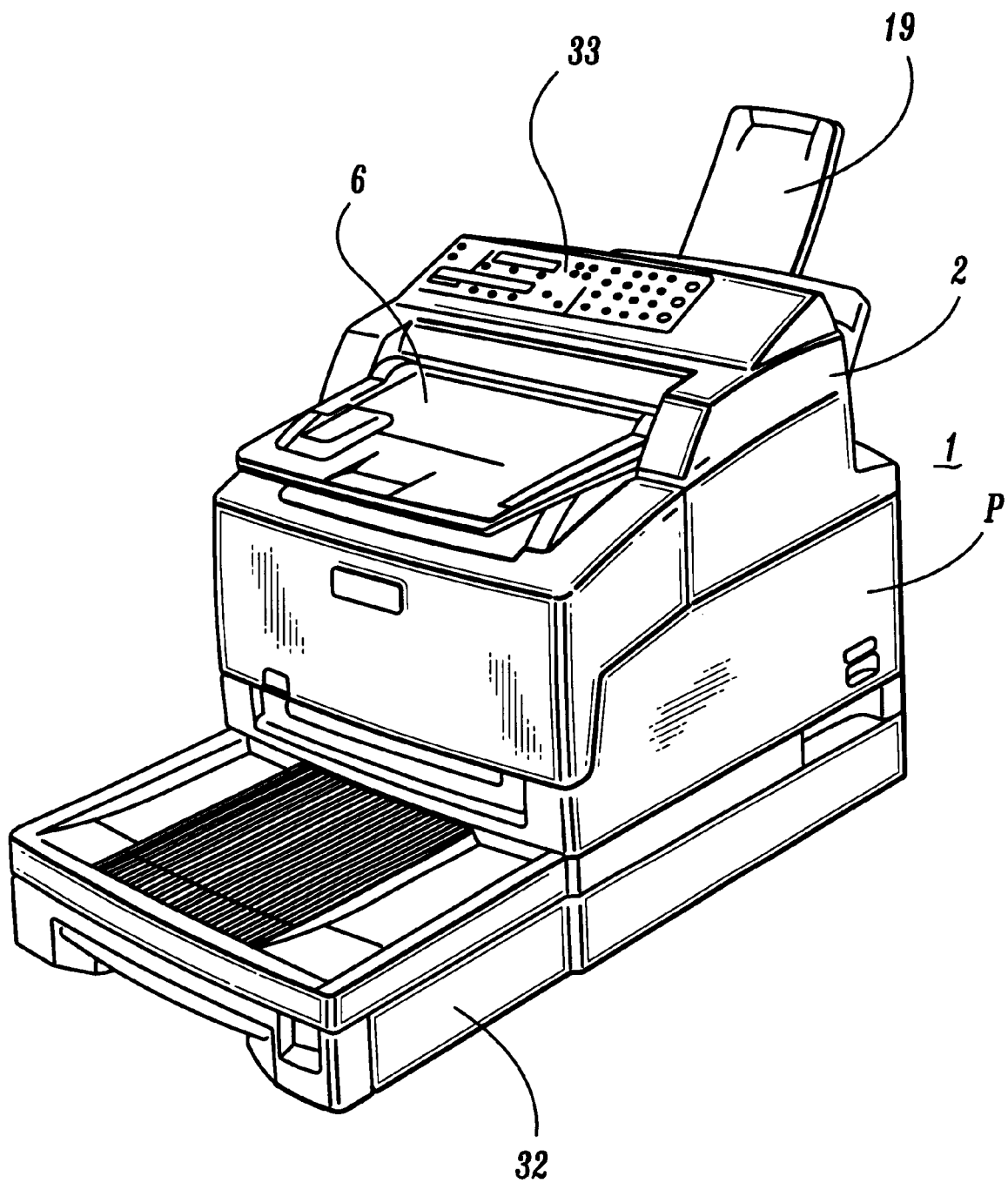
FIG. 3 is a perspective view of a digital multifunctional image processing system of the present application.

Referring now to FIG. 3, the printer P and the scanner unit 2 are mounted on a sheet cassette 32 containing a plurality of sheets therein. Each sheet is fed from cassette 32 toward and into the printer P through the bottom path 24 as described above. The printer P is thus capable of selectively using a sheet S fed from either the sheet setting table 19 or the sheet cassette 32.

Figure 5:
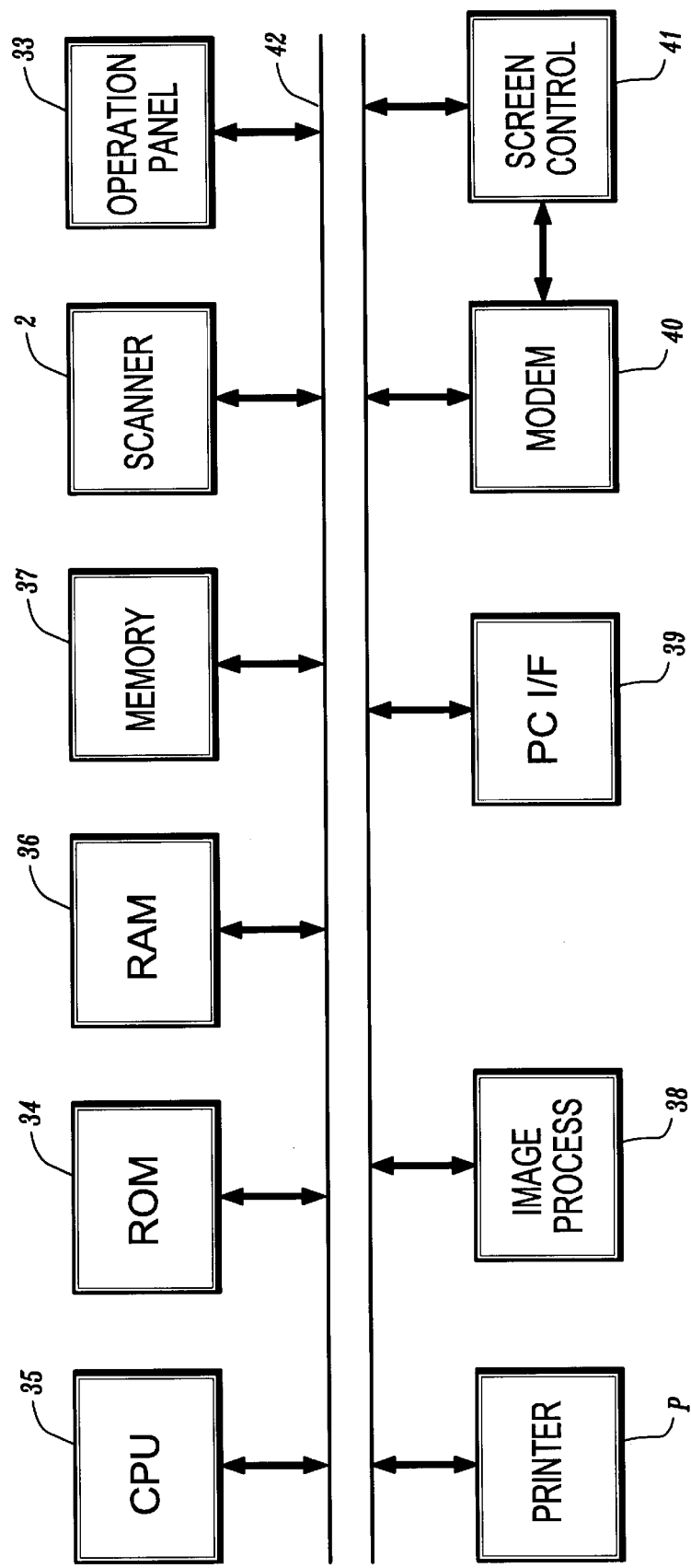
FIG. 5 is a block diagram showing an electrical circuit used in the present application.

Hereinbelow, an electrical circuit used in the above described embodiment is explained referring to FIG. 5. The electrical circuit includes a ROM 34 for storing static data (e.g., a program), a CPU 35 for executing the program while checking status of each of the operations being performed by the system, a RAM 36 for storing changeable data (e.g., work data, erasable data, etc.), an image processing part 38, an interface 39 for connecting to peripherals (e.g., a PC), a memory 37 for storing image data to be printed out, a MODEM 40 for performing a facsimile communication and a screen controlling part 41. Each of these elements are respectively connected via a bus line 42. Further, the scanner unit 2, the operation panel 33 for inputting a plurality of copying parameters, the printer P, and so on are also respectively connected via the bus line 42. Memory 37 is capable of storing a variety of data including document data read by the scanner unit 2, PC data sent from a PC and facsimile data received from a facsimile via a telephone line.

Hereinbelow, operation of the above described system is explained referring again to FIG. 4. When a document is to be read, document setting table 6 is kept in the horizontal position as shown in FIG. 4. The document is set thereon and is fed toward a document reading part 5 of the scanner unit 2. Image information on the document is optically read by the document reading part 5 and the document is then ejected therefrom and supported by the multiple utility tray 19.

The information read by document reading part 5 is selectively sent to a remote facsimile in a facsimile sending mode or printed by printer P on a sheet S fed from a sheet feeding tray 19 in a copy mode. Further, the digital multifunctional image processing apparatus is capable of printing both data sent from a remote facsimile through the MODEM 40 in a facsimile receiving mode and data sent from the PC via the interface 39.

A printing process of the printer P is executed in the copy mode, the PC printing mode and the facsimile printing mode and is explained below in detail. An image carrier 9 is uniformly charged by the charger 10 while rotating clockwise. A latent image is formed by the latent image forming device 18 on the image carrier 9 using data received either from the document reading device 5, or from the facsimile or PC. The latent image is developed by developing device 11 and after that a toner image is obtained and is transferred onto a sheet S fed by the feeding roller 20 from the sheet tray 19, for example. The toner image is then fixed on sheet S by the fixing device 25 and then selectively fed either toward the outlet 28 or the sheet receiving device 26 depending upon a position of the switching gate 31.

Figure 1:
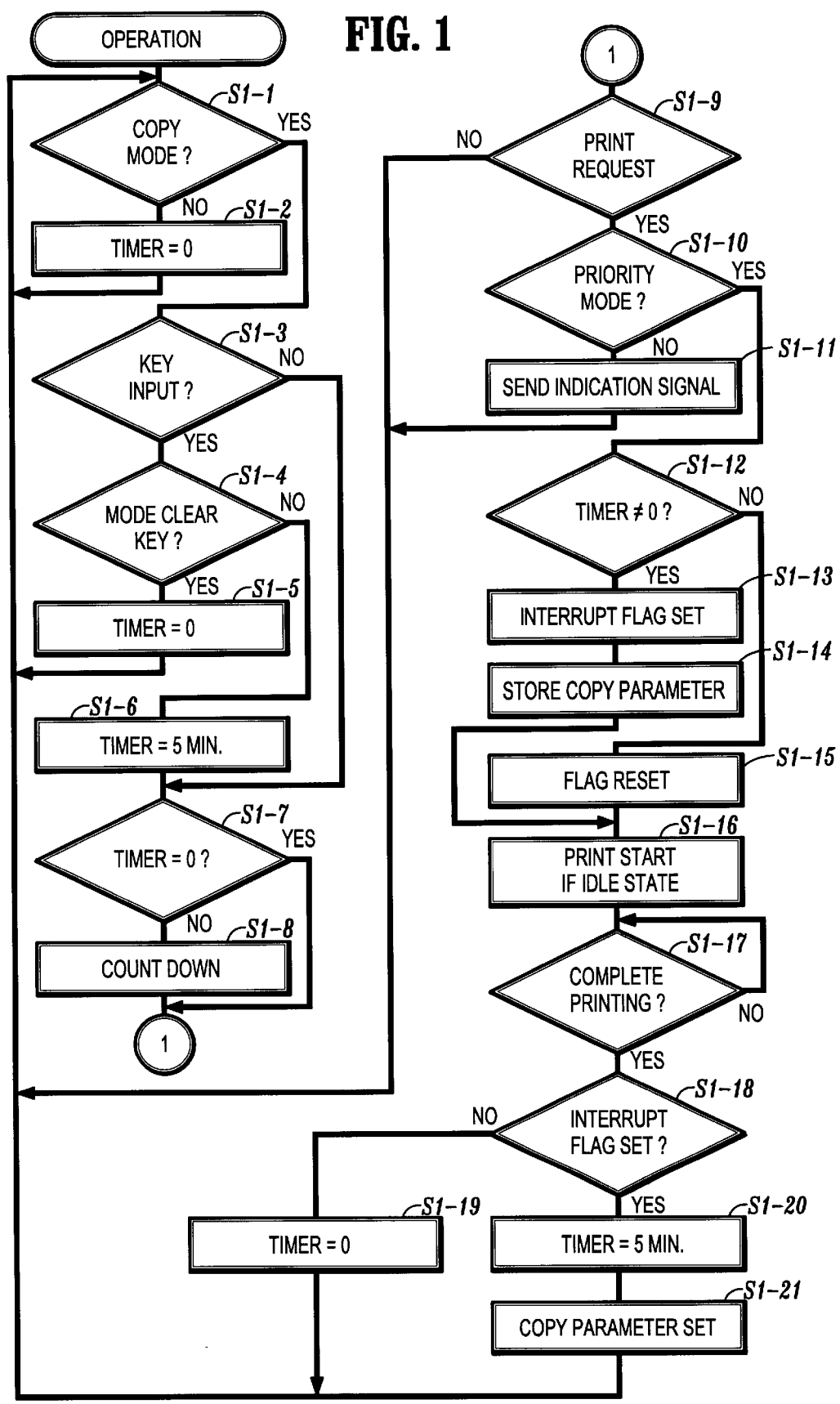
FIG. 1 is a flow chart showing control of a digital multifunctional image processing system of the present application when an interruption printing request from a personal computer is made.

Hereinbelow, a control of the digital multifunctional image processing system when an interruption printing request is made from the PC is explained referring to a flow chart shown in FIG. 1. Whether the system is in a copy mode is checked (Step 1-1). If the system is not in the copy mode, a timer, which starts when one of the copying parameters is input and is used to judge whether the operator has input a copying parameter to the system, is cleared regardless of a status of the timer (Step 1-2). The system then returns to Step 1-1.

On the other hand, if the system is in the copy mode (Yes in Step 1-1), the control proceeds to Step 1-3. In Step 1-3, whether an operator has input a copying parameter via operating panel 33 is checked. If the operator has input a copying parameter (Yes in Step 1-3), a determination is made whether a mode clear key, which is used to clear the copy mode, has been selected (Step 1-4). If the mode clear key has been selected by the operator (Yes in Step 1-4), the timer is cleared regardless of a status of the timer (Step 1-5) and the control returns to Step 1-1, since the operator has canceled the copy mode.

On the other hand, if the operator did not input the mode clear key (No in Step 1-4), the copy mode continues and the timer is set to a predetermined time (Step 1-6). Therefore, even if the copy mode is set (Yes in Step 1-1), unless the copying parameter is input (Step 1-3), the timer is kept at a state of zero (No in Step 1-3, Yes in Step 1-7). If a printing request for the printer P from the PC does not exist (No in Step 1-9), the Steps 1-1, 1-3, 1-7 and 1-9 are repeated.

In the above control steps, the timer=0 in Steps 1-2, 1-5 and 1-7, for example, generally means that the operator is not inputting a copying parameter and if an interruption printing request is made, an interruption printing can be accepted by the printer P. Further, the timer is capable of counting down 5 minutes, for example, which is designed to correspond to the time in which the operator can complete inputting a copying parameter via the operating panel 33. In other words, when the timer is not zero, the operator is in the process of inputting copy operating parameters.

If a printing request from the PC exists (Yes in Step 1-9), it is determined whether the printing request from the PC is to be executed in priority to the inputting of a copying parameter (Step 1-10). To set the priority mode to the system, the user of the PC is capable of setting a priority mode by inputting the appropriate command as displayed on a display of the PC or a user can set the priority mode via operation panel 33 by using a mode setting key, not shown, disposed thereon.

If it is determined that the priority mode is not set (No in Step 1-10), a signal indicating that the system is not capable of printing is outputted to the PC (Step 1-1). When the PC receives such a signal, the PC displays a message on the display thereof so that the operator can take proper actions including requesting interruption printing by setting the priority mode of the printer P from the PC. After sending the indication signal, control returns to Step 1-11.

On the other hand, if the priority mode for the interruption printing is set (Yes in Step 1-10), a status of the timer is checked (Step 1-12). If the timer has been set (Step 1-6) and is not zero (i.e., the five minutes have not yet elapsed) (Yes in Step 1-12) the controller determines that the operator is in the process of inputting copying parameters, the controller then sets an interruption flag (Step 1-13) for allowing the interruption printing. Further, the copying parameter which has already been inputted to the system via the operation panel 33 (Step 1-3) by the operator before the interruption printing request was made from the PC, is stored in the RAM 36, for example (Step 1-14). After that, printing data sent from the PC is printed out by the printer P while the PC priority mode continues.

On the other hand, if the timer is zero (No in Step 1-12), the interruption flag is reset (Step 1-15) since inputting of the copying parameter has not been interrupted by the printing request from the PC. Thereby, the printing request from the PC is automatically accepted and the printing data thereof is printed out by the printer P, if the printer P is on an idling state (i.e., ready to perform printing). By thus controlling the system, whenever the PC requests printing out of the printing data in the PC priority mode, the printing data of the PC is automatically printed out regardless of whether the operator is inputting the copying parameter or not, if the printer P is on the idling state, and ready to print (Step 1-16).

When printing out is completed, (Yes in Step 1-17), the status of the interruption flag is checked (Step 1-18). If the flag has not been set (No in Step 1-18) (i.e., the inputting of the copying parameter has not been interrupted,) the timer is cleared regardless of a state thereof (Step 1-19) and the control returns to Step 1-1.

On the other hand, if the interruption flag is set (Yes in Step 1-18) (i.e., the inputting of the copying parameter has been interrupted), the timer is set again (Step 1-20) and the parameter stored in the RAM 36 is read out and automatically set (Step 1-21), and after that the control returns to the start (Step 1-1). Therefore, if the operator activates a copy start key disposed on the operation panel 33 as the key input, a copying process is executed according to the copying parameter previously set.

Figure 2:
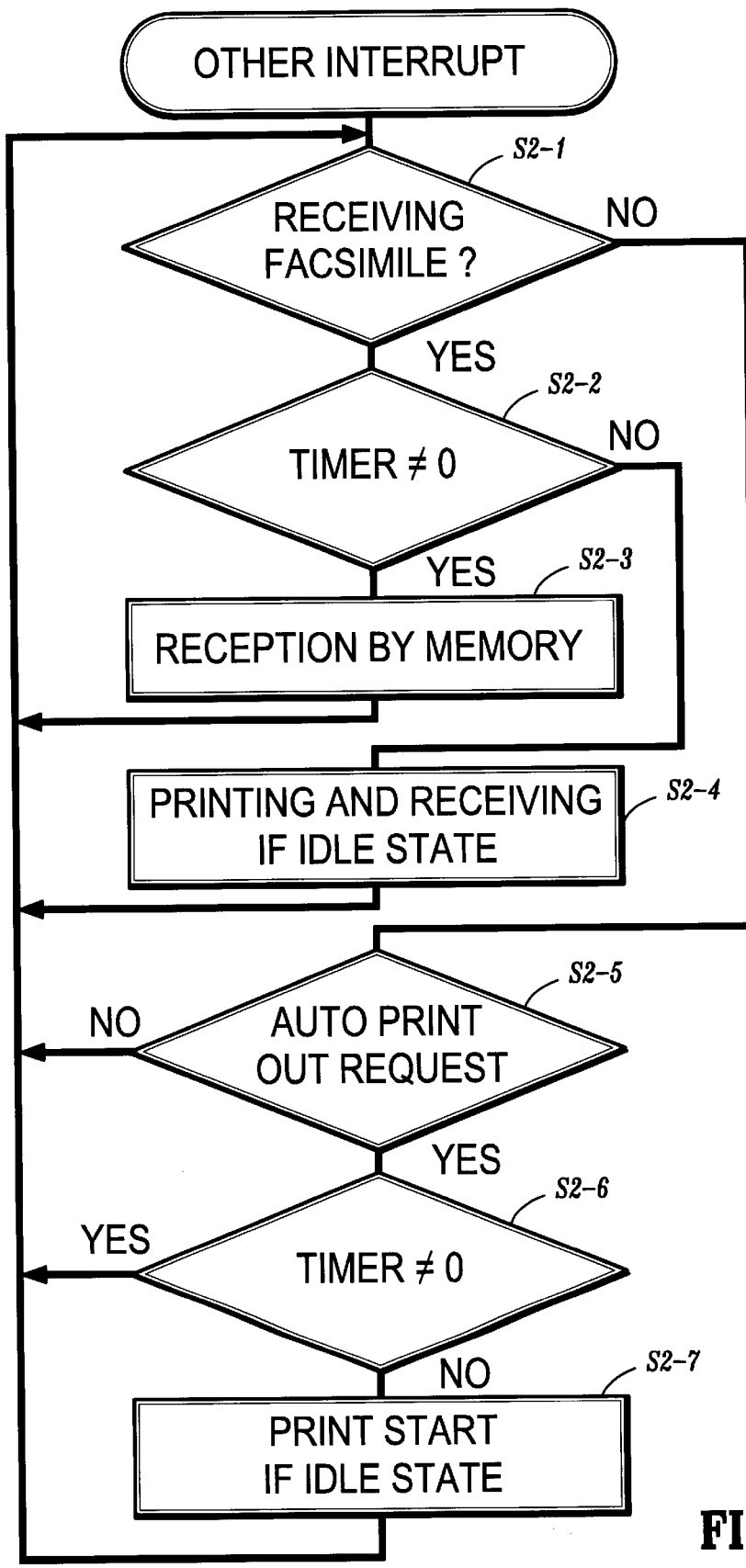
FIG. 2 is a flow chart showing control of a digital multifunctional image processing system of the present application when an interruption printing request from a facsimile is made.

Hereinbelow, an interruption printing request from a facsimile is explained referring to a flow chart shown in FIG. 2. In the digital multifunctional image processing apparatus, CPU 35 always monitors for a printing request from the facsimile (Step 2-1). When the interruption printing request from the facsimile is received, a status of the timer is checked (Step 2-2). If the timer is not zero (Yes in Step 2-2), printing data from the facsimile is stored in memory 37 (Step 2-3) so as not to disturb the operator inputting the copying parameters. If the timer is zero (No in Step 2-2), this means that inputting of the copying parameters by the operator is not being performed or copying is complete, and printing of data sent from the facsimile is executed by the printer P, if the printer P is at an idling state (Step 2-4).

The digital multifunctional image processing apparatus further includes a function for automatically printing out both past facsimile records and an error report at a predetermined time. If an auto printout is requested (Yes in Step 2-5), the status of the timer is checked (Step 2-6). If the timer is not zero (Yes in Step 2-6), the control process returns to Step 2-1, since this indicates that the operator is in the process of inputting the copying parameters. If the time is zero (No in Step 2-6), since the operator is not in the process of inputting the copying parameter, the printer P starts printing either the past facsimile records or the error report (Step 2-7).

Figure 6:
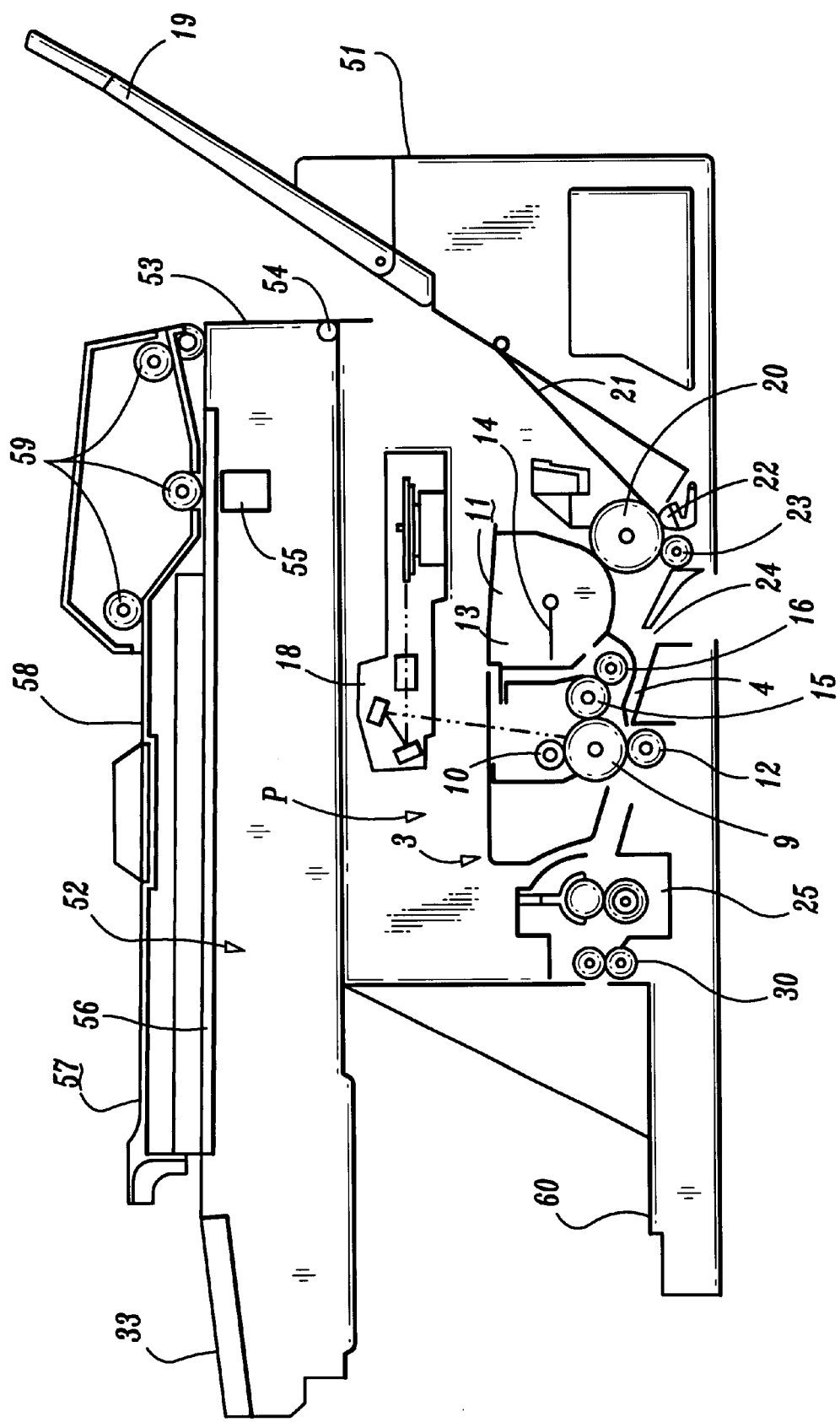
FIG. 6 is a schematic cross sectional view of another digital multifunctional image processing system having a book type scanning device of the present application.

Hereinbelow, a modified digital multifunctional image processing system is explained by reference to FIG. 6. A book type and sheet type image reading scanner unit 52 as shown in FIG. 6 can be employed for the scanner unit 2 as described above. The book type and sheet type image scanning device 52 is disposed on an upper side of the digital multifunctional image processing apparatus 51 for reading images from both book type documents and sheet type documents. The apparatus includes a printer P for printing on a sheet S fed along a sheet feeding path 4. Elements similar or identical to those described above with respect to FIGS. 3 and 4 are identified by like reference numerals and will not be described again in detail below.

The scanner unit 52 is disposed in a scanner unit housing 53 pivotally mounted on the printer P around a supporting shaft 54. The scanner unit housing 53 includes an image reading device 55 for reading an image of a document, a contact glass 56 for setting the document thereon and a pressing member 57 for pressing the document against the contact glass 56. The document pressing member 57 includes a document setting table 58 for setting documents thereon and a plurality of document feeding rollers 59 for feeding the document in a right ward direction as viewed in FIG. 6 toward the image reading device 55. The scanner unit housing 53 further includes an operation panel 33 having the same structure as shown in FIGS. 3 and 4.

In such a scanner unit 52, the document, for example, a book, is set on the contact glass 56 and the image reading device 55 moves and scans the document. Further, a sheet type document is scanned by the image reading device 55 when it is stationed below the document feeding roller 59 while the sheet type document is fed through the image reading device 55.

The modified digital multifunctional image processing apparatus further includes a copysheet setting tray 19 disposed at a rear side thereof for setting a copysheet S thereon and a copysheet receiving tray 60 disposed at a front side thereof for receiving the copysheet S ejected from the printer P. The printer P is disposed inside the digital multifunctional image processing apparatus.

In such a printer, a latent image is formed on a surface of the image carrier 9, and the latent image is developed by a developing device 11. A toner image obtained by the developing device 11 is transferred onto the copysheet S by a transfer device 12 and the toner image is fixed onto the copysheet S by a fixing device 25. The copysheet is then ejected from the digital multifunctional image processing apparatus by a pair of ejecting rollers 30 onto the copysheet receiving tray 60.

Operation of the above described multiple digital image processing apparatus is the same as described earlier referring to FIG. 5. Namely, image information read by the scanner unit 52 can be selectively transferred to a remote facsimile in a facsimile mode or copied on the copysheet S by feeding the copysheet S from the copysheet setting tray 19 in a copy mode. Further, the modified digital multifunctional image processing apparatus is capable of printing out image information sent from the remote facsimile and data sent from a PC connected by a line. Further, an interruption printing request to the modified digital multifunctional image processing apparatus either from a PC or a facsimile is executed in a same manner as described earlier.

Numerous additional modifications and variations of the present application are possible in light of the above teachings. It is therefore to be understood that within the scope of the appended claims, the present application may be practiced otherwise than as specifically described herein.

What is claimed is:

1. A digital multifunctional image processing apparatus including at least one of a printer, a scanner unit and at least one external input, said apparatus comprising:

an operation panel for setting the apparatus in a copy mode and for inputting at least one copying parameter;
parameter input detecting means for detecting input of said at least one copying parameter;
interruption detecting means for detecting an external interruption printing request received via said at least one external input;
timer means tat begins counting a predetermined period of time when the apparatus is in the copy mode, after said parameter input detecting means detects the input of said at least one copying parameter without a copy interrupt being specified by a user; and
inhibiting means for inhibiting printing of printing data associated with said-external interruption printing request for the predetermined period of time, wherein the user is thereby provided with the predetermined period of time to complete setting of copy parameters and to start the corresponding copy job without being interrupted, and said timer means does not begin counting the predetermined period of time, even when said apparatus is in the copy mode, until said parameter input detecting means detects the input of said at least one copying parameter.

2. A digital multifunctional image processing apparatus as claimed in claim 1, further comprising a printing data memory for storing said printing data associated with said external interruption printing request when said interruption detecting means detects said external interruption printing request while said copying parameter is being input.

3. A digital multifunctional image processing apparatus as claimed in claim 2, further comprising an interruption controller for controlling said printer to start printing said printing data associated with said printing request after copying using said copying parameter is finished.

4. A digital multifunctional image processing apparatus as claimed in claim 1, wherein said external interruption printing request is sent from a facsimile connected to said apparatus by a telephone line.

5. A digital multifunctional image processing apparatus as claimed in claim 2, wherein said external interruption printing request is sent from a facsimile connected to said apparatus by a telephone line.

6. A digital multifunctional image processing apparatus as claimed in claim 1, wherein said external interruption printing request is sent from a personal computer connected to said apparatus by a line.

7. A digital multifunctional image processing apparatus as claimed in claim 6, wherein said personal computer is located at a place in close proximity to said digital multifunctional image processing apparatus.

8. A digital multifunctional image processing apparatus as claimed in claim 6, further comprising displaying means for displaying a message on a display of said personal computer when printing of said printing request is inhibited.

9. A digital multifunctional image processing apparatus as claimed in claim 1, wherein said external interruption printing request is made when a status report of said digital multifunctional image processing apparatus is requested.

10. A digital multifunctional image processing apparatus as claimed in claim 9, wherein said printing request is automatically executed after copying using said at least one copying parameter is completed.

11. A digital multifunctional image processing apparatus as claimed in claim 6, further comprising priority setting means for setting a priority to the printing request from said personal computer when requested during inputting of said at least one copying parameter.

12. A digital multifunctional image processing apparatus as claimed in claim 1, wherein said parameter input detecting means outputs a detecting signal during a time that said timer means is counting.

13. A digital multifunctional image processing apparatus as claimed in claim 1, wherein said predetermined period of time is preset at around five minutes.

14. A digital multifunctional image processing apparatus as claimed in claim 1, further comprising a copy mode clear key for clearing the copy mode.

15. A digital multifunctional image processing apparatus as claimed in claim 14, wherein said timer means is reset when said copy mode is cleared by operation of said copy mode clear key.

16. A digital multifunctional image processing apparatus as claimed in claim 11, further comprising a parameter memory for storing said at least one copying parameter already input before said external interruption printing request is made.

17. A digital multifunctional image processing apparatus as claimed in claim 16, further comprising a parameter controller for controlling said operation panel to read out said copying parameter stored in said parameter memory and for automatically setting the read out said copying parameter.

18. A printing system, comprising:
   a digital multifunctional image processing apparatus comprising a printer, a scanner unit an operational panel and a MODEM, for printing either in a copying mode or a facsimile mode;
   a facsimile connected to said digital multifunctional image processing apparatus by a telephone line;
   a timer that begins counting a predetermined period of time when the apparatus is in the copying mode, after a copying parameter is input to said operational panel without a copy interrupt being specified by a user; and
   a controller for controlling said printer to inhibit printing requested from said facsimile for the predetermined period of time, wherein the user is thereby provided with the predetermined period of time to complete setting of copy parameters and to start the corresponding copy job without being interrupted, and said timer does not begin counting the predetermined period of time, even when said apparatus is in said copying mode, until the copying parameter is input to said operational panel.

19. A printing system claimed in claim 18, further comprising:
   a memory for storing data sent from said facsimile when said printing request from said facsimile is made and inhibited.

20. A printing system, comprising:
   a digital multifunctional image processing apparatus comprising a printer, a scanner unit, an operational panel and an interface for peripherals, for printing either in a copying mode or a printer mode;
   a personal computer connected to said digital multifunctional image processing apparatus through said interface by a line;
   a timer that begins counting a predetermined period of time when the apparatus is in the copying mode after a copying parameter is input to said operation panel without a copy interrupt being specified by a user, and
   a controller for controlling said printer to inhibit printing requested from said personal computer for the predetermined period of time, wherein the user is thereby provided with the predetermined period of time to complete setting of copy parameters and to start the corresponding copy job without being interrupted, and said timer does not begin counting the predetermined period of time, even when said apparatus is in said copying mode, until the copying parameter is input to said operational panel.

21. A printing system as claimed in claim 20, further comprising priority mode setting means for setting priority to printing request from said personal computer even while said copying parameter is input.

22. A printing system as claimed in claim 21, further comprising a parameter memory for storing one or more parameters input when inputting of said copying parameter is interrupted by said setting priority mode for said personal computer.

23. An image processing apparatus comprising:
   at least one input for receiving at least one of facsimile data and computer data;
   a scanner for scanning documents and providing image data;
   a printer operating in a copy mode for printing the image data provided by the scanner and in a print mode for printing the at least one of facsimile data and computer data;
   an operation panel for inputting copying parameters to the image processing apparatus;
   a timer that begins counting a predetermined period of time when the apparatus is in the copy mode, after a copying parameter is input without a copy interrupt being specified by a user, and
   a controller for controlling said image processing apparatus, said controller inhibiting printing of the at least one of facsimile data and computer data for the predetermined period of time, wherein the user is thereby provided with the predetermined period of time to complete setting of copy parameters and to start the corresponding copy job without being interrupted, and said timer does not begin counting the predetermined period of time, even when said apparatus is in said copy mode, until the copying parameter is input.

24. A method of operating a multifunctional image processing system, said system including an image processing apparatus including a printer, a scanner and at least one external input, said apparatus capable of operating in a copy mode or a printer mode, said method comprising the steps of:
   determining when a copy parameter, used for setting a copying function for printing scanned information, has been input;
   detecting when an external print request is received via said at least one external input;
   beginning a timer for counting a predetermined period of time when the apparatus is in the copy mode, after the determining step determines that the copy parameter has been input without a copy interrupt being specified by a user; and
   inhibiting printing of printing data associated with said external print request for the predetermined period of time, wherein the user is thereby provided with the predetermined period of time to complete setting of copy parameters and to start the corresponding copy job without being interrupted, and the timer does not begin counting the predetermined period of time, even when said apparatus is in the copy mode, until the copy parameter is input.

25. A method as recited in claim 24, further comprising a step of storing said printing data associated with said external print request when said external print request is detected while said copy parameter is being input.

26. A method as recited in claim 24, further comprising step of printing said printing data associated with said external print request after printing using said copy parameter is finished.

* * * * *